US008199975B2

(12) United States Patent
Pomerleau et al.

(10) Patent No.: US 8,199,975 B2
(45) Date of Patent: Jun. 12, 2012

(54) SYSTEM AND METHOD FOR SIDE VISION DETECTION OF OBSTACLES FOR VEHICLES

(75) Inventors: Dean Arthur Pomerleau, Gibsonia, PA (US); Jay W. Gowdy, Gibsonia, PA (US); Matthew Troup, Gibsonia, PA (US); Sanjay Nichani, San Diego, CA (US)

(73) Assignee: Cognex Corporation, Natick, MA (US)

( * ) Notice: Subject to any disclaimer, the term of this patent is extended or adjusted under 35 U.S.C. 154(b) by 987 days.

(21) Appl. No.: 11/954,513

(22) Filed: Dec. 12, 2007

(65) Prior Publication Data

US 2008/0304705 A1 Dec. 11, 2008

Related U.S. Application Data

(60) Provisional application No. 60/869,681, filed on Dec. 12, 2006.

(51) Int. Cl.
*G06K 9/00* (2006.01)
(52) U.S. Cl. ......... 382/104; 382/154; 340/937; 701/301
(58) Field of Classification Search .................. 382/104, 382/103, 154; 340/933, 937; 348/113, 118; 701/1, 117, 301
See application file for complete search history.

(56) References Cited

U.S. PATENT DOCUMENTS

| 5,424,952 | A  | * | 6/1995  | Asayama ...................... 701/200 |
| 5,530,420 | A  |   | 6/1996  | Tsuchiya et al. |
| 5,719,954 | A  |   | 2/1998  | Onda |
| 5,937,079 | A  |   | 8/1999  | Franke |
| 6,396,397 | B1 | * | 5/2002  | Bos et al. ....................... 340/461 |
| 6,737,964 | B2 | * | 5/2004  | Samman et al. .............. 340/436 |
| 6,963,661 | B1 |   | 11/2005 | Hattori et al. |
| 7,046,822 | B1 |   | 5/2006  | Knoeppel et al. |
| 7,091,837 | B2 |   | 8/2006  | Nakai et al. |
| 7,209,031 | B2 |   | 4/2007  | Nakai et al. |
| 7,251,346 | B2 |   | 7/2007  | Higaki et al. |
| 2004/0003409 | A1 | * | 1/2004 | Berstis ........................... 725/105 |
| 2006/0077543 | A1 |   | 4/2006 | Miyoshi et al. |
| 2006/0206243 | A1 | * | 9/2006 | Pawlicki et al. .................. 701/1 |

(Continued)

OTHER PUBLICATIONS

Tsai, Roger Y., "A Versatile Camera Calibration Technique for High-Accuracy 3D Machine Vision Metrology Using Off-the Shelf TV Cameras", "The Importance of Versatile Camer Calibration", Aug. 1987, pp. 323-344, vol. RA-3, No. 4, Publisher: IEEE, Published in: Yew York/USA.

(Continued)

*Primary Examiner* — Jon Chang
(74) *Attorney, Agent, or Firm* — William A. Loginov

(57) ABSTRACT

This invention provides a system and method for object detection and collision avoidance for objects and vehicles located behind the cab or front section of an elongated, and possibly tandem, vehicle. Through the use of narrow-baseline stereo vision that can be vertically oriented relative to the ground/road surface, the system and method can employ relatively inexpensive cameras, in a stereo relationship, on a low-profile mounting, to perform reliable detection with good range discrimination. The field of detection is sufficiently behind and aside the rear area to assure an adequate safety zone in most instances. Moreover, this system and method allows all equipment to be maintained on the cab of a tandem vehicle, rather than the interchangeable, and more-prone-to-damage cargo section and/or trailer. One or more cameras can be mounted on, or within, the mirror on each side, on aerodynamic fairings or other exposed locations of the vehicle. Image signals received from each camera can be conditioned before they are matched and compared for disparities viewed above the ground surface, and according to predetermined disparity criteria.

20 Claims, 12 Drawing Sheets

U.S. PATENT DOCUMENTS

2006/0239509 A1    10/2006  Saito
2007/0177011 A1*   8/2007   Lewin et al. .................. 348/118

OTHER PUBLICATIONS

Zhang, Zhengyou, "A Flexible New Technique for Camera Calibration", Dec. 2, 1998, pp. 2-21, Publisher: Microsoft Research, Published in: Redmond, Washington/USA.

Thorpe et al, "Safe Robot Driving in Cluttered Environments", "The Need for 360 Degree Safeguarding", Oct. 2003, Publisher: Robotics Consortium, Published in: Pittsburgh, PA/USA.

Matuszyk et al, "Stereo Panoramic Vision for Monitoring Vehicle Bline-Spots", "Intelligent Vehicle Symposium", Jun. 14, 2004, pp. 31-36, Publisher: IEEE, Published in: Parma, Italy.

Tarak Gandhi et al, "Vehicle Surround Capture: Survey of Techniques and a Novel Omni Video Based Approach for Dynamic Panoramic Surround Map", "Computer Vision and Robotics Research Laboratory", Sep. 2006, pp. 1-17, Publisher: Nissan Research Center, Published in: La Jolla, CA/USA.

* cited by examiner

SYSTEM AND METHOD FOR SIDE VISION DETECTION OF OBSTACLES FOR VEHICLES

RELATED APPLICATIONS

This application claims the benefit of U.S. Provisional Application Ser. No. 60/869,681, filed Dec. 12, 2006, entitled STEREO VISION SYSTEM FOR SIDE VISION DETECTION OF OBSTACLES FOR VEHICLES, the entire disclosure of which is herein incorporated by reference.

STATEMENT REGARDING FEDERALLY SPONSORED RESEARCH OR DEVELOPMENT

This invention was made with U.S. government support under U.S. Department of Transportation National Highway Traffic Safety Administration Cooperative Agreement Numbers DTNH22-05-H-01232 and DTFH61-01-X-00053. The government has certain rights in this invention.

FIELD OF THE INVENTION

This invention relates to machine vision systems, and more particularly to vehicle-borne methods and apparatuses for detecting obstacles and potential colliding objects.

BACKGROUND OF THE INVENTION

To improve safety of our roads a number of safety systems for automobiles have been developed, which entail a variety of differing approaches to the challenge. Many safety systems are concerned with the avoidance of collisions between vehicles and obstacles, pedestrians or other vehicles. Some of these approaches contemplate the use of camera-based vision systems. Notably, camera systems directed forwardly have been employed in an attempt to create self-guiding automobiles and other vehicles. A compendium of various approaches which may employ vision systems is described in *Vehicle Surround Capture: Survey of Techniques and a Novel Omni Video Based Approach for Dynamic Panoramic Surround Maps,* 2006, some of which should not be considered prior art as not predating applicant's invention of the concepts herein.

Trucks and tractor trailers are responsible for transporting a substantial portion of the goods used in commerce in the US and other countries. They are present on virtually every road or highway. Unlike their smaller counterparts, automobiles and motorized cycles, the size and weight of a truck makes it more difficult to maneuver and stop, and its driver's ability to view obstacles and vehicles (particularly those located behind and aside) may be much more limited. Moreover, when a truck collides with another vehicle or pedestrian, the other smaller vehicle or pedestrian may not survive. Thus, safety systems that warn of the potential for such collisions are highly desirable.

Some trucks are equipped with localized radar units, or other types of sensors, in an attempt to provide warning prior to lane change or turning in an effort to avoid a catastrophic collision. These systems tend to be short range and, in part due to their expense, are mounted only on the cab. Thus, objects/vehicles moving along the side of the rear-mounted truck trailer may not be sensed in time, if at all. Also, stationary objects are not effectively sensed by radar.

Camera-based vision systems offer a potential solution. However, most camera systems tend to view a wide field and a single camera may have trouble discriminating range and movement of an object, in the same way that closing one eye tends to reduce a person's depth perception. While some vehicle guidance systems (mounted front-facing) have employed so-called "stereo vision," which emulates an animal's natural horizontal placement of eyes so as to provide range discrimination, this approach is not as effective for dealing with objects that tend to have more vertical than horizontal features, such as pedestrians, sign posts and motorcycles. Such objects tend to get lost in the horizontal spread of a conventional stereo vision arrangement.

Accordingly, it is desirable to provide a safety system, employing a camera-based vision system that allows the entire unit to be mounted on the cab so that trailers and cargo structures are removable from the truck without need of changing over any vision system components. The system should allow for the use of conventional camera components with high reliability and durability, should be relatively unobtrusive and provide good discrimination of vertically featured objects along the rearward sides of the truck, behind the cab.

SUMMARY OF THE INVENTION

This invention overcomes disadvantages of the prior art by providing a system and method for object detection and collision avoidance for objects and vehicles located behind the cab or front section of an elongated, and possibly tandem, vehicle. Through the use of narrow-baseline stereo vision that can be vertically oriented relative to the ground/road surface, the system and method can employ relatively inexpensive cameras, in a stereo relationship, on a low-profile mounting, to perform reliable detection with good range discrimination. The field of detection is sufficiently behind and aside the rear area to assure an adequate safety zone in most instances. Moreover, this system and method allows all equipment to be maintained on the cab of a tandem vehicle, rather than the interchangeable and more-prone-to-damage cargo section and/or trailer. One or more cameras can be mounted on, or within, the mirror on each side, on aerodynamic fairings or other exposed locations of the vehicle. Image signals received from each camera can be conditioned before they are matched and compared for disparities viewed above the ground surface, and according to predetermined disparity criteria.

The pair of stereo cameras can be mounted on at least one side of a vehicle looking in at downward angle and back towards the rear of the vehicle. Optionally, another pair of stereo cameras can be mounted on the other side of the vehicle to provide coverage of both sides of the vehicle simultaneously. The invention is calibrated to provide heights above the ground plane for any point in a field of view such as the road next to and extending behind the vehicle. Therefore, when any object enters the field of view, it generates interest points called "features", the heights of which are measured relative to the ground plane. These points are then clustered in image and 3D space to provide "objects". The position of these objects are then reported to one or more other systems, such as, for example, a "virtual mirror", which could directly make drivers more aware of obstacles in the lanes along side of, and extending behind their vehicle, or a warning system, which alerts the driver when making a lane change that would cause an accident.

In an illustrative embodiment of the invention, a system and method for detecting objects and vehicles with respect to a host vehicle includes providing a pair of cameras mounted on a host vehicle, and arranged with respect to each other in a narrow-baseline orientation. A processor is provided, which detects an object or vehicle and that derives an approximate range based upon an input image from each of the pair of cameras. In addition, an output device is provided, which reports detection of the object or vehicle within a predetermined range of the host vehicle. Each of the pair of cameras are mounted so as to orient the narrow-baseline is a substantially vertical direction normal to a ground surface beneath the host vehicle, and each of the cameras can include a field of view having an increased resolution of pixels oriented along the vertical direction. In an illustrative embodiment, each of the pair of cameras can be directed rearwardly from a front section of the host vehicle so as to view an area along a side of the host vehicle and beyond a back end of the host vehicle. Moreover, at least one of the pair of cameras can be mounted on a rear view mirror on a side of the host vehicle. In general, pairs of cameras can be mounted on both sides of the vehicle in accordance with the teachings of this invention to provide full coverage.

In an illustrative embodiment, each of the pair of cameras can be, furthermore, mounted in a stereo head housing on the rear view mirror, and/or at least one of the pair of cameras can be mounted within a housing of the rear view mirror as an integrated mirror unit as an option. Another one of the pair of cameras can be mounted at a location on the host vehicle remote from the rear view mirror in various embodiments, thereby providing further vertical and/or horizontal separation between each of the cameras. As a further option, at least one of the pair of cameras is mounted on an aerodynamic fairing of the host vehicle. Such an aerodynamic fairing can include a cowling that houses the at least one of the pair of cameras so as to allow the at least one of the pair of cameras to view the area along a side of the host vehicle and beyond a back end of the host vehicle.

In an illustrative embodiment the processor can include an image rectification process, an image smoothing process and a max–min filter process constructed and arranged to condition image data from each of the pair of cameras and a matching process that matches the conditioned image data to derive a disparity image from which objects and vehicles above a ground surface beneath the host vehicle are detected in accordance with parameters of a disparity criteria image. The processor can further comprise a spurious edge filtering process and an edge aggregation process that act upon detected images of objects and vehicles so as to generate a report of detected objects that is provided to the output device.

The host vehicle can be an elongated and/or tandem vehicle, such as a tractor trailer where the front section carrying the cameras comprises a cab thereof.

BRIEF DESCRIPTION OF THE DRAWINGS

The invention description below refers to the accompanying drawings, of which.

DETAILED DESCRIPTION

Figure 1:
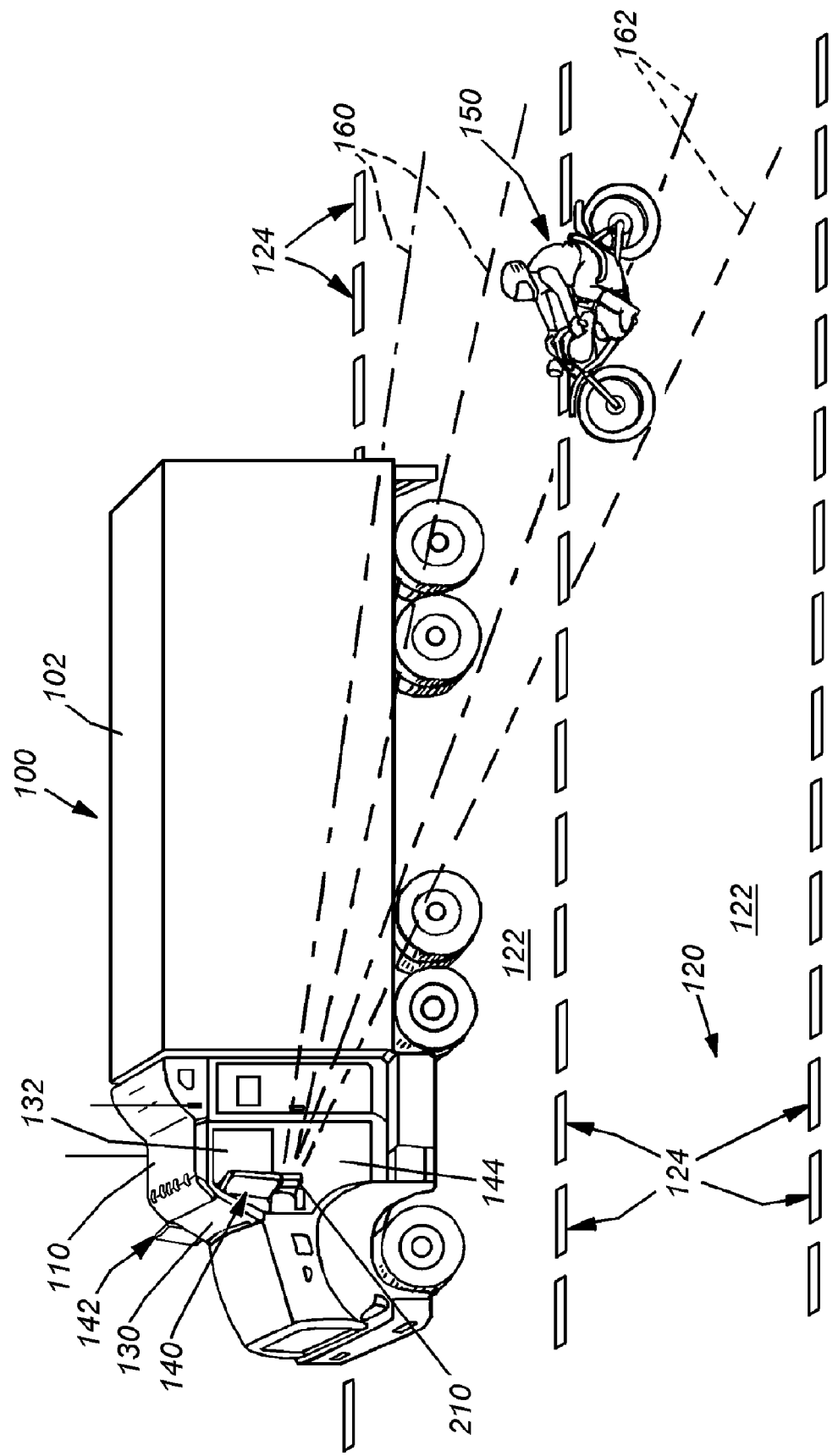
FIG. 1 is a side perspective view of an illustrative embodiment of a tractor-trailer-cab-mounted obstacle and vehicle detection system and a typical type of detected vehicle.

FIG. 1 shows an obstacle detection and collision-avoidance system mounted on an exemplary tractor trailer 100. The tractor trailer (also part of a class of large cargo vehicles termed generally herein as a "truck") 100 includes a box trailer 102 and a cab 110. The cab 110 houses the driver and provides the motive power for the rig. The driver is mounted relatively high in the cab 110 above the road surface 120, which consists of a plurality of highway lanes 122, separated by dividing lines 124. The cab windshield 130 affords the driver good visibility of the road ahead at long, medium and somewhat close distances. Likewise, the side windows 132 afford the driver a good view of obstacles and vehicles that are substantially aside the cab. Because rear view of the cab is occluded by the tall trailer 102, the driver relies upon large mirror assemblies 140, 142, which are horizontally spaced from the adjacent cab door (driver-side door 144 being shown in FIG. 1 and the passenger door 146 shown in FIG. 2). These mirrors give a good view of objects aside the trailer such as the depicted motorcycle and rider 150. However, while diligent monitoring of mirrors is important, it is desirable to provide a more-automated and fulltime warning of the presence of such vehicles or objects as any collision by the truck 100 with a smaller vehicle may prove fatal to the occupant. Thus, with further reference to FIG. 2, a rear-facing stereo vision system is mounted on the cab with corresponding rear-directed cameras 210, 212 beneath each respective mirror assembly. The cameras provide two discrete image views (dashed lines 160 and 162 in FIG. 1) of the depicted vehicle 150.

Figure 2:
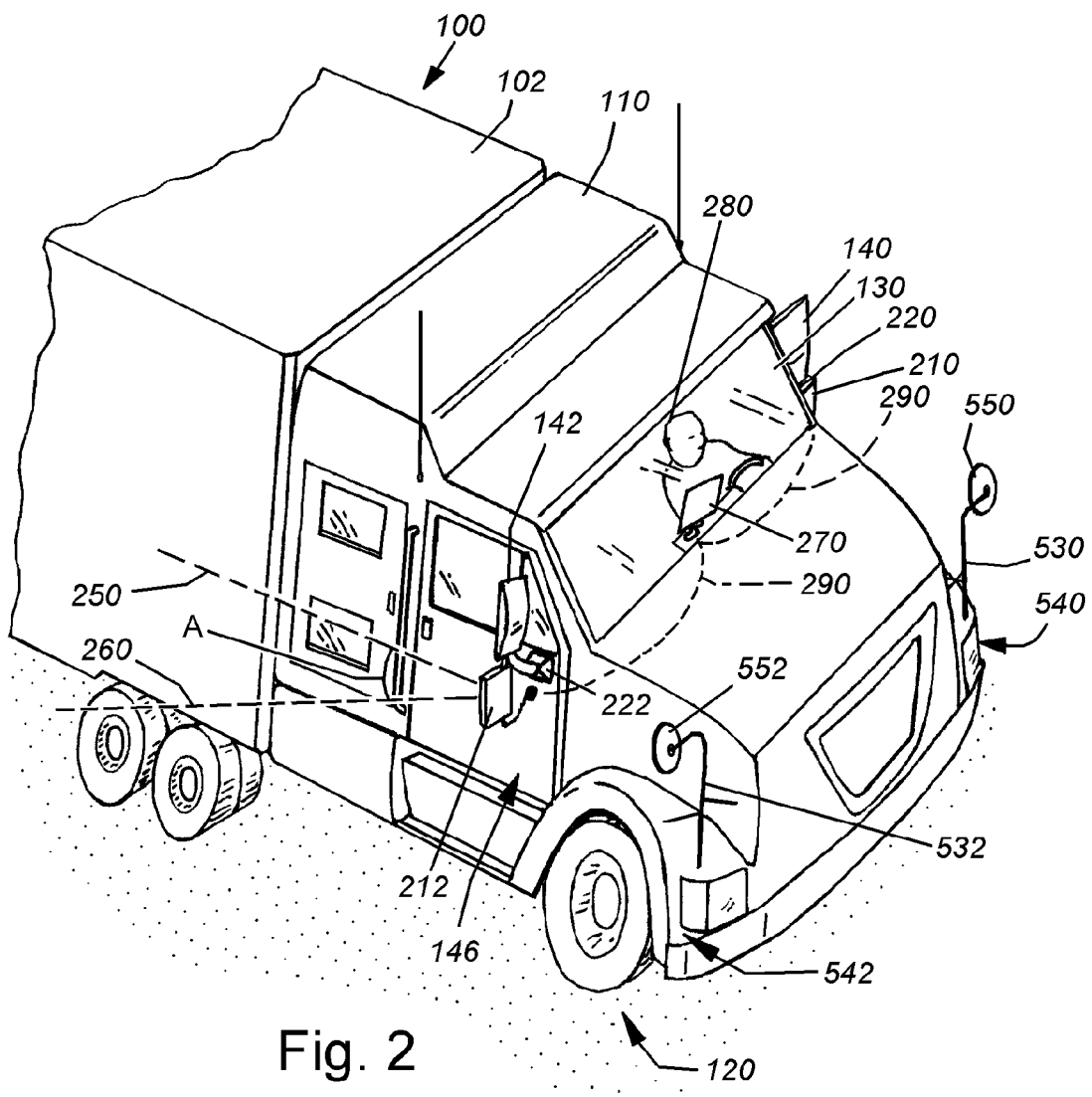
FIG. 2 is a partial perspective view of the exemplary tractor trailer of FIG. 1 showing the obstacle detection layout according to an illustrative embodiment of the invention in which two stereo cameras are mounted together on the mirrors of the cab.

More particularly, and with reference to FIG. 2, which shows a portion of the tractor-trailer truck 100 of FIG. 1, the illustrative embodiment includes two pairs of stereo cameras 210, 212 mounted on either side of the cab 110. The mirrors 140 and 142 in this example are a conventional type with lower support brackets 220, 222 respectively that depend from each door 144, 146. Their mirror glass is oriented to face rearwardly toward the back of the tractor-trailer truck 100, thereby affording the driver a view of the rear sides of the rig.

Figure 3:
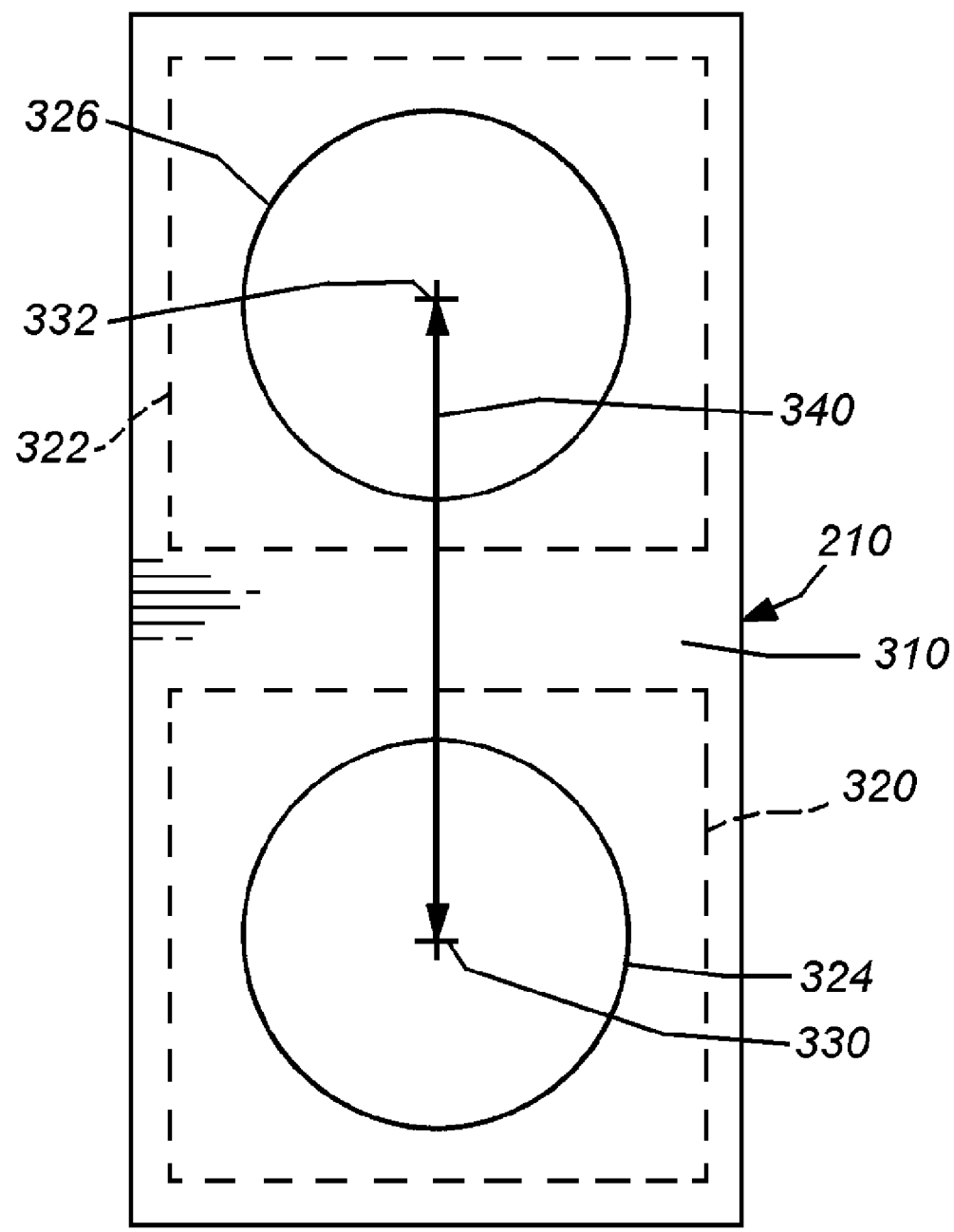
FIG. 3 is a schematic plan view of a narrow-baseline stereo camera head for use in an illustrative embodiment of the invention.

Each stereo camera pair 210, 212 is mounted on the respective mirror bracket 220 and to face rearwardly at an appropriate angle to image the region adjacent to, and behind, the cab, thereby acting in essence, as automated mirrors within a predetermined viewing band as described further below. A front/plan view of one of the stereo camera pair assemblies 210 is shown in FIG. 3. The depicted stereo pair assembly 210 is fixtured within a stereo housing or "head" 310, which can take any form and can include an aerodynamic fairing along its front-facing side. The housing encloses two cameras 320, 322 (shown schematically in phantom), with lenses 324, 326 having respective optical axes 330, 332 spaced apart by a narrow distance 340. Note that a camera "stereo pair" herein is defined as two discrete cameras that can be positioned at various spacings and/or distances from one another, two cameras included within a head, or fixtured separately, and oriented at any angle to each other. The dual-camera configuration shown in FIG. 3 is commonly referred to as a narrow-baseline stereo head. The narrow baseline stereo head offers the advantages that it can be attached to the truck cab 110 at one place, and optionally in a vertical arrangement as shown in FIG. 3. It should be apparent to one skilled in the art that the individual cameras 320, 322 can be fixtured without the head housing (310) in the same vertical arrangement as depicted. This would offer the advantage of a small profile as does the stereo head 10 although two separate cameras as opposed to two cameras within the stereo head 310 would need to be fixtured to the subject vehicle.

Figure 4:
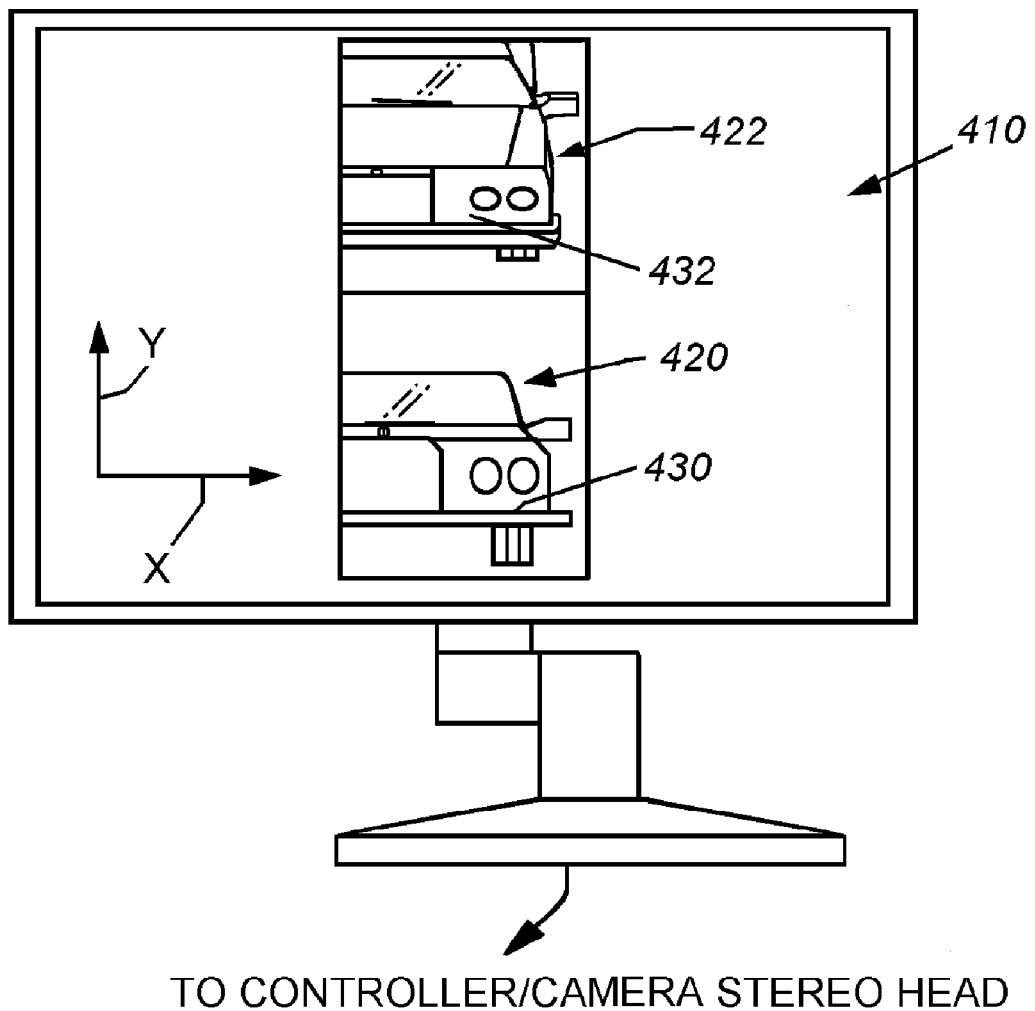
FIG. 4 is a diagram of a screen display depicting the relative views of a vehicle derived from the camera head arrangement of FIG. 3.

In an exemplary system, the baseline distance 340 between the optical centers of the cameras is approximately 12 cm, and less than approximately 20 cm is typical. Also, in an exemplary system, the lenses 324, 326 have a focal length of approximately 5.8 mm (approximately 50-degree Horizontal Field of View ("HFOV")). An exemplary display of a pair of images derived from the stereo pair 210 is shown in FIG. 4. The display 410 includes a pair of sub-windows 420, 422 arranged vertically in the manner of the two narrow-baseline cameras 320, 322. In this depiction, the field of view (FOV) of each camera's image sensor is arranged so that the wider aspect is located vertically, thereby creating a taller (vertically in the "Y" direction) and narrower (horizontally in the "X" direction) image as shown. For the purposes of this description, the term "vertical" means normal to a flat ground surface and aligned generally with the force of gravity, while "horizontal" means generally parallel to the ground and perpendicular to the direction of the force of gravity. However these directions are otherwise conventions only and can be reoriented for differing applications. As described above, this vertically elongated aspect, while illustrative only, assists in detecting changes in position in vertically oriented features, such as those in motorcycles, etc. In the exemplary sub-windows 420, 422, each depiction of an imaged automobile 430, 432 defines a differing pose between each of the respective image fields, which allows for object/vehicle range discrimination as described further below.

Figure 5:
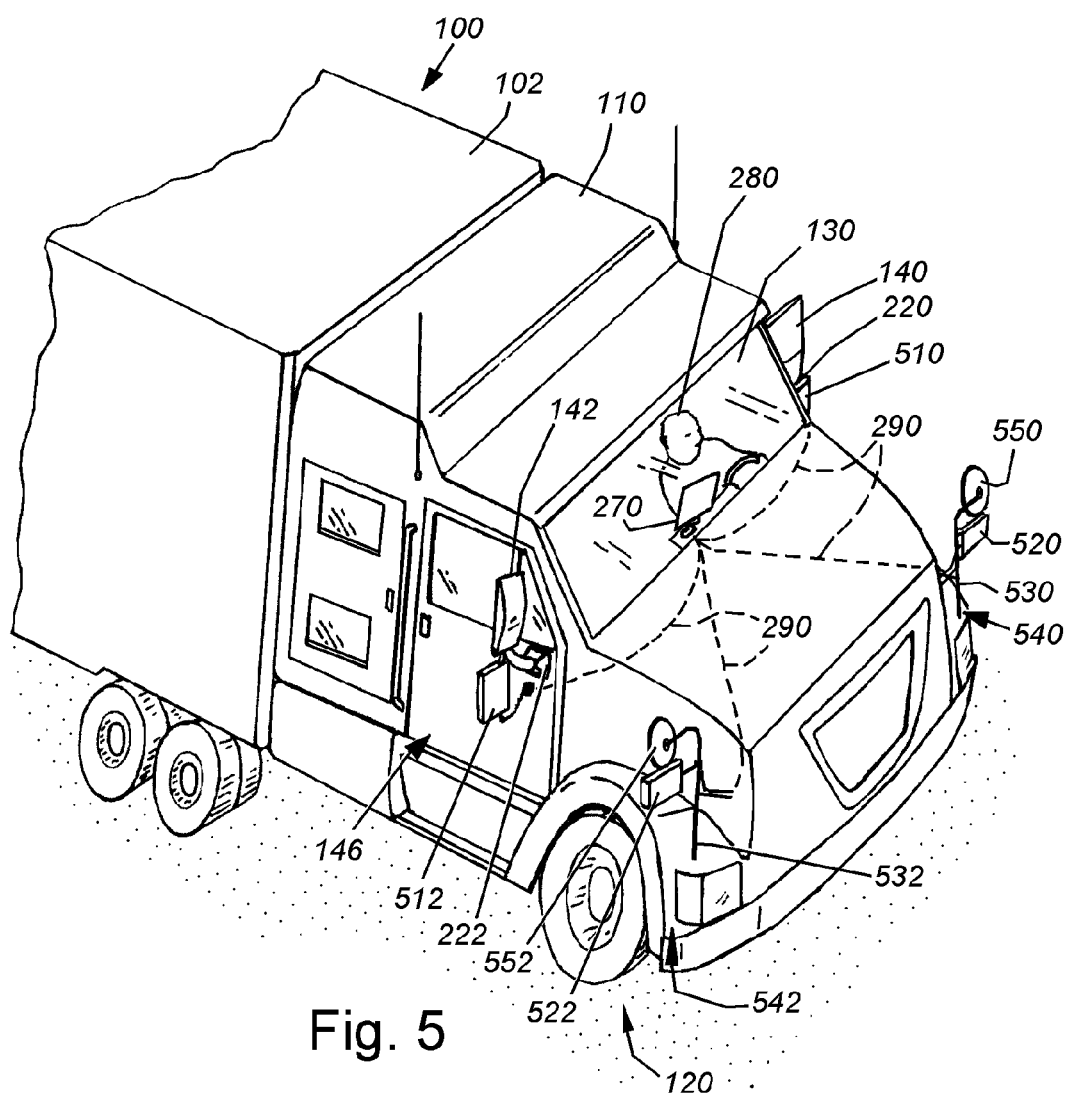
FIG. 5 is a partial perspective view of an exemplary tractor trailer showing the obstacle detection layout according to another illustrative embodiment of the invention in which individual cameras are mounted on each mirror and corresponding individual cameras are mounted on fender mirror posts so as to provide a stereo viewing layout.

In an alternate arrangement (in accordance with the above-described term "stereo pair"), two cameras can be positioned physically farther apart. Such a wider-spaced arrangement is shown in FIG. 5 which depicts it in conjunction with the above-described, exemplary truck 100 and cab 110. This illustrative embodiment provides a layout of a wide-based stereo pair camera system having two separate cameras 510 and 520 for the stereo pair on the left (driver) side, and two separate cameras 512 and 522 for the stereo pair on the right (passenger) side. The cameras 510 and 512 are mounted beneath the respective door-mounted mirrors 140, 142 as described generally above. The other cameras 520, 522 in each stereo pair are mounted on respective posts 530, 532 that project from the cab's front fenders 540, 542, or another convenient outboard location (e.g. the front bumper). The upright posts 530, 532 can be conventional or customized units, which may also support marker lights, flags and/or additional forward-placed, rear-view mirrors side mirrors 550, 552, respectively.

It is recognized by the invention that for a two-part vehicle, consisting of the tractor 110 and the trailer 102 it may be desirable to mount the cameras on the necessary component that is the tractor 110. This is because the trailer 102 is typically interchangeable, subject to rough handling, long-term (possibly insecure) storage, and damage. Therefore, the expense of deploying a system according to the illustrative embodiment may be limited by mounting sensors on just the tractor 110 while still allowing the system to monitor the whole area adjacent to the trailer.

In this illustrative embodiment, the cameras (320, 322 or 510, 520, etc.) of each stereo pair are positioned and aligned substantially vertically with respect to the ground surface plane 120, so that there is defined a top camera and a bottom camera. The illustrative vertical arrangement offers advantages when used to detect some of the common obstacles presented to vehicles. More specifically, the invention recognizes that using "narrow-baseline" stereo in the vertical arrangement may be desirable when compared with the typical horizontal arrangement for detecting other vehicles and other obstacles typically encountered by moving vehicles. Most of the distinctive and easily detectable (via contrast differences, etc.) features to detect, such as the tops bottoms, and internal structure of cars, trucks and cycles, extend in a largely horizontal direction, which a vertically arranged stereo system can usually detect better than a horizontally arranged stereo system. This better detection of horizontal features results because, among other reasons, the features are perpendicular to the epipolar line, where an epipolar line is known to those skilled in the art and described in further detail below. Additionally, a vertically arranged stereo pair is generally easier to mount on the side of a commercial or other vehicle, and the vertically arranged stereo pair provides a better profile(s) when mounted on the side of the vehicle. In many commercial vehicles, such as trucks, their width is sizable, and projections beyond that width must be limited to prevent overhang into the next lane or the curb/shoulder of the road. Both of the preceding advantages are captured regardless of how the cameras in the stereo pair are rotated within a head (e.g. 210) or separately (e.g. FIG. 5). It is mainly desired that the two stereo cameras be positioned vertically with respect to each other and the ground.

A third advantage of the above-described vertical arrangement only applies when orientation of the cameras with respect to the ground 120 is vertical, so that horizontal lines in the world become vertical lines in the image. Most camera systems have better resolution in the horizontal than vertical direction, especially if only one field of an interlaced CCD camera system is used, so by orienting the cameras vertically, the system can orient the direction of maximum resolution along the long axis of the vehicle where the increased resolution is desirable.

Figure 6:
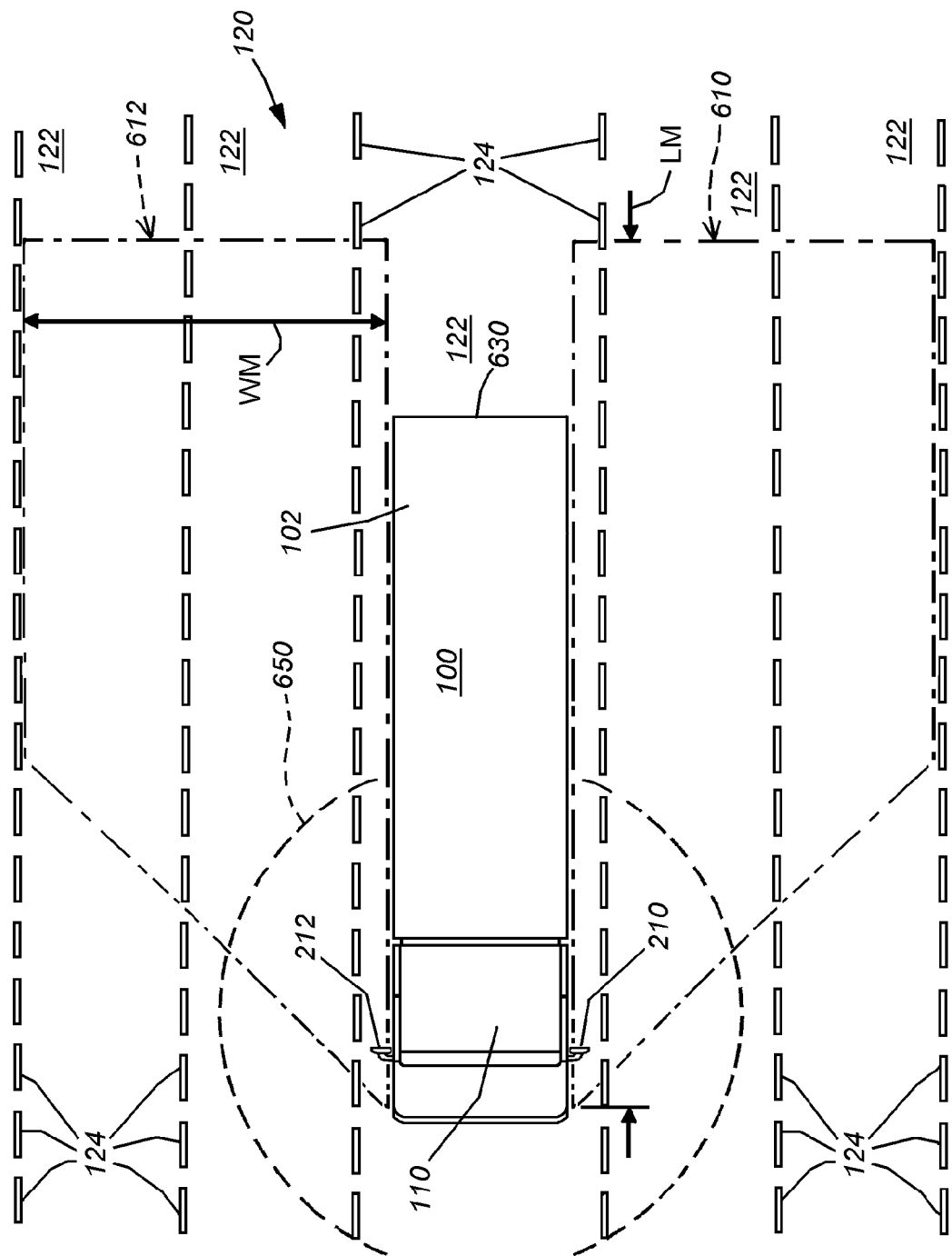
FIG. 6 is a top view of one field-of-view that is imaged with respect to an exemplary tractor trailer according to an illustrative embodiment of the invention.

In the exemplary embodiment, the captured field of view (represented by dashed-line trapezoids 610, 612) is illustrated in FIG. 6, showing a top view of the exemplary tractor-trailer 100. In this embodiment each stereo pair 210 and 212 is mounted from approximately one to two meters from the ground/road surface 120, and each stereo pair 210, 212 monitors a respective area 610, 612 approximately 6 m wide (WM) and 24 m long (LM) on each side of the tractor-trailer 100.

The viewed area 610, 612 covers up to approximately six meters, or two adjacent lanes 122, along each side of the tractor-trailer 100, and approximately 2-5 meters behind the back end 630 of the trailer 102.

The area of primary importance for the exemplary embodiment is one-half the width WM of each viewing area 610, 612. One-half the width WM effectively covers one lane 122 of traffic/obstacles adjacent to the truck 100, which if monitored, can help inform the driver of the presence of obstacles, such as other vehicles, in the adjacent lane prior to changing lanes. A large portion, but possibly not all, of the viewed area 610, 612 is typically within the field of view of the driver s mirrors. The invention recognizes that this area 610, 612 is a principle area to be monitored for the driver of an elongated vehicle.

By way of further background, the prior art describes non-stereo based vision methods to capture portions of this area 610, 612, such as described in *Safe Robot Driving in Cluttered Environments*, C. Thorpe. J. D. Carlson. D. Duggins, J. Gowdy, R. MacLachlan, C. Mertz, A. Suppe, and C. Wang, Proceedings of the 11th International Symposium of Robotics Research, October, 2003. Among the prior systems described to capture portions of this area 610, 612 are monocular systems. The invention recognizes that monocular systems are not as well suited as stereo to the task of viewing obstacles in the area 610, 612 for vehicles. Stereo vision fundamentally sees obstacles (features that stickup up), whereas other techniques indirectly see them (by interpreting color or motion). Other techniques can, therefore, be fooled by things that are not obstacles, but are moving correctly—such as shadows of vehicles moving parallel. Such monocular systems can also be fooled by things that look like obstacles—such as oddly colored pavement or shadows. Further, such monocular systems can miss large classes of objects. For instance many monocular systems that use optical flow methods or motion stereo only see moving obstacles, and ignore fixed obstacles such as traffic barriers or stopped cars.

Figure 7:
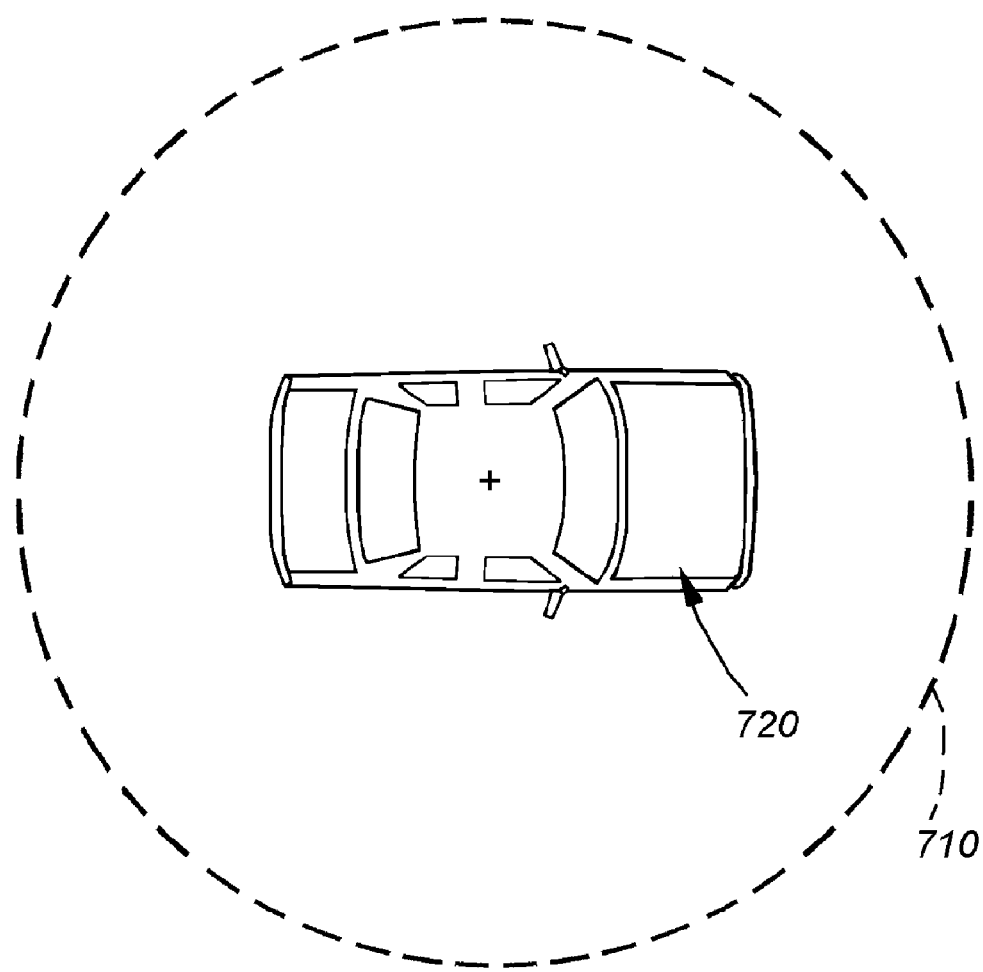
FIG. 7 is a schematic layout of a different field of view that is imaged with respect to an exemplary automobile, areas of which field may be covered by prior art systems and methods.

A discussion of the use of rear-looking stereo is found in *Stereo Panoramic Vision for Monitoring Vehicle Blind-spots*, Matusyk, Leanne and Zelinsky Alexander, 2004 IEEE Intelligent Vehicles Symposium. Matusyk teaches the use of sensors to obtain a panoramic field of view to monitor the rear of the vehicle, and proposes (although does not show) then extension of the system to monitor all around the vehicle. FIG. 7 shows, by way of background, an ideal version of a panoramic field (dashed circle 710) of view is typical for cars 720 in accordance with Matusyk. Using the teachings of Matusyk, one can simply superimpose the panoramic field of view of Matusyk on the tractor trailer cab 110 of FIG. 6 to derive that resulting, somewhat panoramic viewing field circle 650. This circle is generally broken at the rear by the trailer. In any case, it should be clear to those of ordinary skill that the method of Matusyk fails to view most of the area 610, 612, providing a highly limited solution to the problem of locating vehicles/obstacles located alongside the long trailer section.

Hence, by using a narrow field of view, a stereo pair according to an illustrative embodiment can monitor a large distance backwards, one or two lanes wide next to and behind any vehicle, including an elongated vehicle such as the exemplary tractor trailer 100. In illustrative embodiments, the cameras (320, 322, 510, 520, etc.) are oriented at an angle A (FIG. 2) relative to a line 250 parallel to the ground plane 120, so that their axes (approximated by line 260) look downward. In this manner, obstacles alongside and behind the vehicle will be located in the field of view of the cameras. In an exemplary system, the surface normal to the plane of the cameras within the stereo pairs 210 and 212 points downward and backwards as shown generally in FIG. 2, wherein the cameras housed within each head are angled down just enough to view objects approximately 2 meters above the ground at 24 meters distance from each camera. The angle A of the cameras may be modified to capture other objects without departing from the scope of the invention.

It should be apparent to those skilled in the art that the cameras can be located at other places or other positions on the tractor with a stereo pair for one or both sides, and wherein the stereo pair for each side has a wider or smaller baseline. It should also be apparent that a stereo pair can be mounted on only one side of the vehicle without departing from the scope of the invention.

Figure 8:
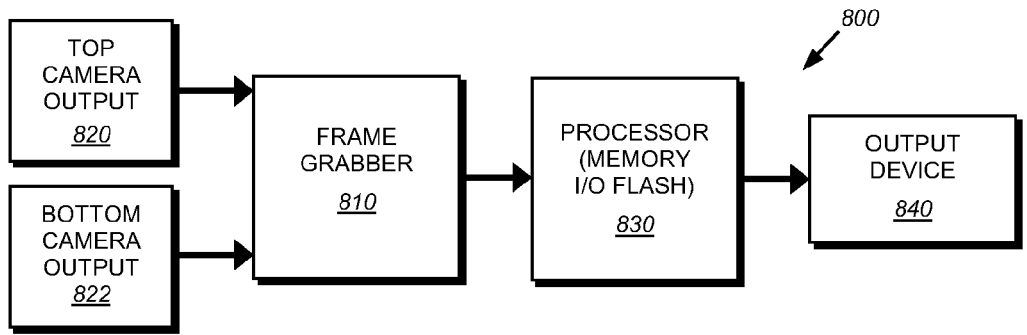
FIGS. 8 and 9 are each schematic block diagrams of two alternate configurations of system components according to illustrative embodiments of the present invention.

At least two possible system configurations can be used to implement the present invention. FIG. 8 shows a first illustrative system configuration 800 of one stereo pair, such as stereo pair 210 as shown in FIGS. 2 and 3, the systems monitoring the top and bottom are tightly integrated. A frame grabber 810 receives video data output from both the top camera (820) and bottom camera (822), which is processed on a processing system 830. The processing system 830 can be any acceptable vision processor that discriminates based upon (for example) contrast differences and/or blob analysis between the object and its surroundings, and resolves the locational differences (in each camera field of view) between matching features in the two images. The differences are used to compute the range of the object in a manner described further below. The system 800 then outputs the results for obstacles on the one side, or back of the vehicle, to one or more output devices 840. These output devices can include a virtual mirror with a video display 270, shown generally on the driver's (280) dashboard in FIG. 2. The display can be substituted with or augmented with other warnings, such as audible alarms, beepers and/or horns (including a recorded/synthesized spoken alert), as well as visible alerts including flashing lights, meters or other display icons that indicate the side and (optionally) the range of the vehicle/obstacle. In more advanced systems the output 840 can be integrated with an automated steering, acceleration and braking system.

Figure 9:
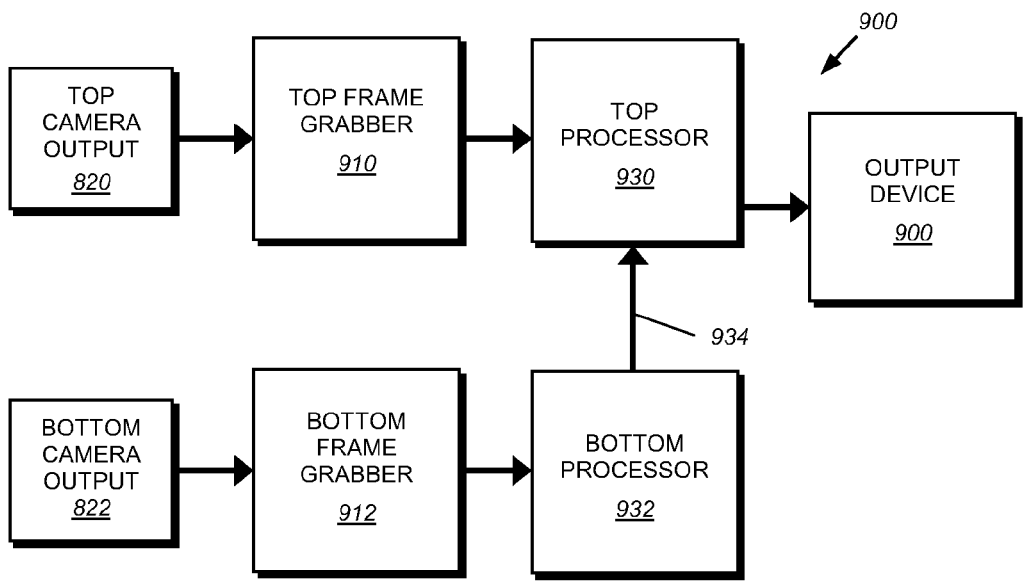

A second illustrative system configuration 900 is shown in FIG. 9. In this embodiment, independent systems monitor top and bottom camera outputs (820, 822) separately. Two separate frame grabbers 910, 912 receive respective inputs from each of the top and bottom cameras. A separate processor 930 and 932 processes the respective output from each frame grabber 910 and 912. The processors 930, 932 merge their results (via branch connection 934) and one or both processors produce a final detecting and range result that is provided to the output device 940. Each system 800 or 900 generally outputs its results independently for its respective side of the vehicle.

In systems having a stereo pair for both the right and left sides of the vehicle, both stereo pairs can share one output device (such as device screen 270), and/or share one common processing system. The processing system can be mounted in the camera housing(s) or can be located in a cab-mounted box, including within the display 270 itself. Data and power are provided to and from each camera via cabling (or wirelessly) as indicated by the dashed connection lines 290 in FIGS. 2 and 5.

Additionally, other possible system configurations can be employed in alternate embodiments. For example, although in the systems 800 and 900 of FIGS. 8 and 9, respectively use one or more frame grabbers, the system can function without a frame grabber. The images from each camera need only digitized in some manner, and input into the one or more processors. Once digitized, the images can also stored and later retrieved from memory (included in the processor), and can be used for quality assurance, later driver training, or games, for example.

Figure 10:
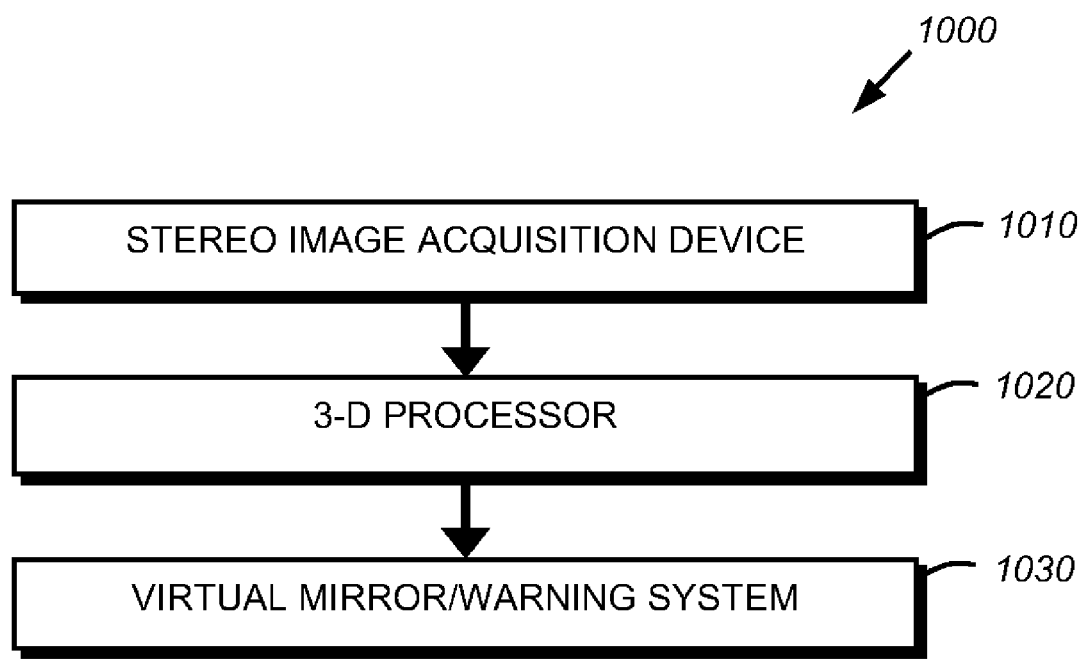
FIG. 10 is a flow diagram of the obstacle-detection process employed in conjunction with the illustrative embodiments of the present invention.

FIG. 10 illustrates a generalized block diagram of an obstacle-detection system or apparatus 1000 of the type in which the invention is practiced. In summary, the system 1000 includes a stereo image acquisition device 1010, such as two conventional cameras (CCD, CMOS, etc.) that each generate an image of a field of view. The stereo image acquisition device 1010 transmits image data to a three-dimensional (3D) processor 1020 either in a stream or upon request by the processor. The 3D processor can be any processing device or module capable of performing at least the minimum processing steps described hereinafter (in FIG. 11) to detect obstacles. Once detected, the processor 1020 communicates with an output device 1030, such as a virtual mirror and/or warning system (for example, dash-mounted console display 270).

Note that a personal computer (PC), laptop computer, a personal data assistant (PDA), dedicated processor, or any number or combination of processing devices are capable of serving as a 3D processor, either alone, or in conjunction with one another, according to the present invention. Further, those skilled in the art will appreciate that the 3D processor can be partitioned locally, or otherwise, in more than one manner without departing from the scope of the invention.

In the illustrative embodiment of the present invention various parameters of the system (in enabling it to detect objects and discriminate range thereof) are set up at the place of manufacture. Such factory setup involves calibration and the computation of the intrinsic parameters for the cameras, and the relative orientation between the cameras. Calibration involves the solution of several sub-problems, as discussed hereinafter, each of which has several solutions that are well-understood by persons having ordinary skill in the art. Further rectification coefficients described hereinafter, are computed to enable runtime image correction.

Stereo measurements can be made in a coordinate system that is different from the coordinate systems of either camera. For example the scene or world coordinates correspond to the points in a viewed scene. Camera coordinates (top and bottom) correspond to the viewer-centered representation of scene points. Undistorted image coordinates correspond to scene points projected onto the image plane. Distorted image coordinates correspond to points having undergone lens distortion. Pixel coordinates correspond to the grid of image samples in the image array. In the illustrative embodiment, one camera is designated to be a "reference camera" to which the stereo coordinate system is tied. An interior orientation process is performed to determine the internal geometry of a camera. These parameters, also called the intrinsic parameters, include the following: (a) effective focal length, also called the camera constant; (b) location of the principal point, also called the image center; (c) radial distortion coefficients; and (d) horizontal scale factor, also called the aspect ratio. The cameras used in the illustrative embodiment have fixed-focus lenses that cannot be modified; therefore these parameters can be computed and preset at the factory.

A relative orientation process is also performed during factory setup to determine the relative position and orientation between two cameras from projections of calibration points in the scene. Again, the cameras are mechanically fixtured such that they stay in alignment, and hence, these parameters can also be preset at the factory.

A rectification process, closely associated with the relative orientation is also performed during setup. Rectification is the process of resampling stereo images so that epipolar lines correspond to image rows. More particularly an epipolar line on one stereo image corresponding to a given point in another stereo image is the perspective projection on the first stereo image of the three-dimensional ray that is the inverse perspective projection of the given point from the other stereo image (Robert M. Haralick & Linda G. Shapiro, *Computer and Robot Vision*, Vol. II, p. 598 (1993)). If the two images are coplanar and the horizontal axes are collinear (no rotation about the optical axis), then the image rows are epipolar lines, and stereo correspondences can be found along corresponding rows. These images, referred to as normal image pairs, provide computational advantages because the rectification of normal image pairs need only be performed one time.

The illustrative method for rectifying the images is independent of the representation used for the given pose of the two cameras. It relies on the principal that any perspective projection is a projective projection. Image planes corresponding to the two cameras are replaced by image planes with the desired geometry (normal image pair), while keeping the geometry of the rays spanned by the points and the projection centers intact. This results in a planar projective transformation. These coefficients can also be computed at the factory. Given the parameters computed in interior orientation, relative orientation and rectification, the camera images can be corrected for distortion and misalignment either in software or hardware. The resulting corrected images have the geometry of a normal image pair square pixels, aligned optical planes, aligned axes (rows), and pinhole camera model.

The relationship of a stereo pair to the ground plane (road surface 120) is established before operation. Ground plane calibration can be performed in a variety of ways, such as direct measurement of the height and orientation of the head above the ground, through user selection of a set of features on the ground that can be seen by both stereo cameras; or through taking a stereo depth image of a flat area with sufficient horizontal features and fitting a plane to the results.

In the illustrative system, regions of the images which are expected to contain the vehicle itself are set up manually. This involves capturing the image from the reference camera (camera that the stereo coordinate system is tied to), rectifying it, displaying it, and then using a graphics overlay tool to specify the areas expected to contain the vehicle. The invention automatically sets up the 6-meter zone adjacent to the vehicle, and extending backwards as the zone in which to monitor for objects. Filtering is performed to exclusively process features inside this zone. In alternate embodiments of the invention, automatic setup can be performed by laying out fiducial markings or tape on the ground, or by auto-detection of the vehicle profile in a controlled, flat environment. In addition, other embodiments of the invention may modify the vehicle and active zones depending on the turn-rate of the vehicle, as the size and shape of the zones for an articulated vehicle such as a tractor-trailer may change significantly in the course of tight turns.

Figure 11:
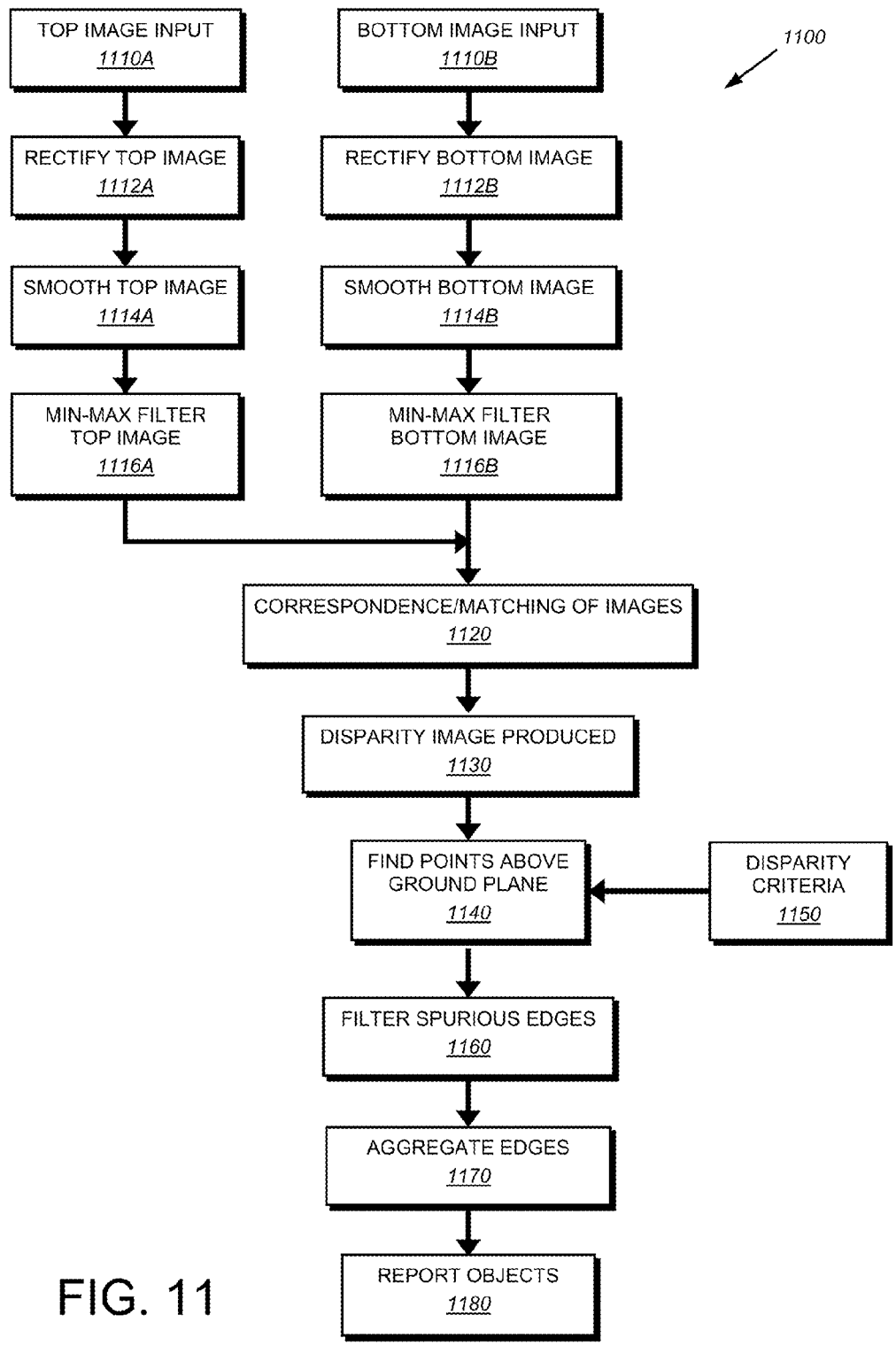
FIG. 11 is a schematic block diagram of an obstacle detection apparatus according to an illustrative embodiment of the present invention.

While there are several processes that may be employed to perform stereo vision according to the present invention, one illustrative embodiment of a process 1100 is outlined below with reference to FIG. 11. The images (Top (A) and Bottom (B)) are, respectively, input to the system processor(s) (steps 1110A and 1110B), acquired (steps 1112A, 1112B), and smoothed (steps 114A and 1114B), using a Gaussian or a parabolic low-pass filter at a certain sigma(s). Stereo systems have been shown to be more effective when not processing raw images. Instead, the exemplar has a Max–Min filter process (steps 1116A, 1116B) that enhances the edges, where the enhanced edges are embodied in the outputted second derivative image. The Max–Min filter takes the following steps:

1. Find Maximum of a neighborhood of size 2*n+1 max;
2. Find Minimum of a neighborhood of size 2*n+1 min;
3. Compute Contrast=(max−min);
4. Compute Midpoint (max+min)/2;
5. C=Center pixel value a neighborhood; and
6. Generate a 2nd derivative image for matching purposes, for each pixel Value=128+C−Midpoint.

The smoothed Max–Min filter process has several advantages over normal high-pass or edge-detection filters used to preprocess for stereo matching. For example, it is a band pass operator, as the Gaussian filter first removes the high frequency image elements, and then it performs the Max–Min operation which behaves as a high-pass filter so that low frequencies are eliminated. Therefore, it is not as sensitive to noise as some of the other candidate high-pass filters suggested in the art. In addition, it does not dislocate boundaries of the object as the final operation is a Max–Min.

A matching process, also called a correspondence procedure, (step 1120) receives the second derivative images and uses this result to match small constant-sized windows of the filtered reference image (e.g. the top image) to corresponding windows in the other filtered image (e.g. the bottom image). The windows are matched using the sums of absolute differences (SAD) approach, where the score for a match between two windows is the sum of the absolute difference between the corresponding elements of the windows. The scoring of a match is called the Strength of Match (SOM). The initial set of possible matches for each feature is constrained using the epipolar constraint.

Next an iterative winner-take-all procedure that enforces the uniqueness of a match is applied. The matching process 1120 consists of the following sub-steps: (a) at each iteration, the matches for which the SOM is maximum for both of the features forming them are chosen as correct; then, because of the uniqueness constraint, all other associated matches with these two features are eliminated from further consideration. This allows further matches to be selected as correct provided that they now have the highest SOM for both constituent tokens. The matcher produces a disparity image (step 1130), where every match is recorded with the resulting best disparity.

A disparity image is an image where each point is either zero (0), representing no match, or the distance value (in pixels) between where a small window around that point in the reference image was found in the other image. Smaller disparities mean a greater distance from the camera for a ray emerging from the reference image and intersecting an object, and larger disparities mean closer.

Next, the procedure searches for points/features which are located at a certain distance above the ground plane 120. A number of procedures can be employed to accomplish this goal. However, where a camera may have possibly rolled, the procedure desirable employs the disparity image. Accordingly, at startup when the procedure 1100 obtains the ground plane description, the procedure generates a disparity criteria image (input box 1150). This criteria image 1150 represents the disparity value that would result from perfectly imaging a plane at the criteria distance above the ground plane. Any potential obstacle with a height greater than the criteria distance will return disparities greater than (i.e. closer than) the corresponding pixels of the disparity criteria image. Thus, the procedure 1100 generates a feature image by marking all pixels for which the disparity from the generated disparity image (from step 1130) is greater than the corresponding pixel in the disparity criteria image.

It should be clear that if an alternate procedure is employed to locate points above the ground plane, then the disparity image and/or disparity criteria image may be optional, or may not be necessary.

More particularly, the feature image will have occasional small defects due to inevitable stereo mismatches. Real features tend to result in patches at least the size of the stereo matching window, while spurious matches tend to be isolated to smaller areas. In this embodiment the procedure 1100 first filters the spurious matches in the feature image (step 1160) before it aggregates the matches (step 1170). However, it should be clear that the order of aggregating and filtering can be altered without departing from the scope of the invention. Thus the illustrative procedure 1100 filters most of the mismatches by using image erosion, a conventional morphological image processing technique. In the erosion step, the procedure passes a 3×3 window over the feature image, and if there are zero elements in a window, the element at the center of the window is set to zero. This step eliminates any feature regions smaller than 3×3, which empirically eliminates the vast majority of spurious features from the resulting filtered feature image while retaining most real features.

The elements of the filtered feature image are then clustered together (aggregation step 1170) using standard region segmentation approaches so that feature pixels that are contiguous in the image with similar disparity (i.e. contiguous in 3D space) are conglomerated together into objects. These objects are then reported to the output device of the system (step 1180). In the illustrative collision-avoidance system this is accomplished through outputting CAN (Control Area Network) messages on a CAN bus.

Although various calibration methods are described herein in terms of illustrative embodiments of the invention, persons having ordinary skill in the art should appreciate that any number of calibration methods can be used without departing from the spirit and scope of the invention. See, for example, R. Y. Tsai, *A Versatile Camera Calibration Technique for High-accuracy 3D Machine Vision Metrology Using Off-the-shelf TV Cameras and Lenses*, Robotics and Automation, Vol. 3, No. 4, pp. 323-344, and Z. Zhang, *Flexible New Technique for Camera Calibration*, TR-98-71, MICROSOFT Research, MICROSOFT CORPORATION, pp 1-22 (Mar. 25, 1999).

Figure 12:
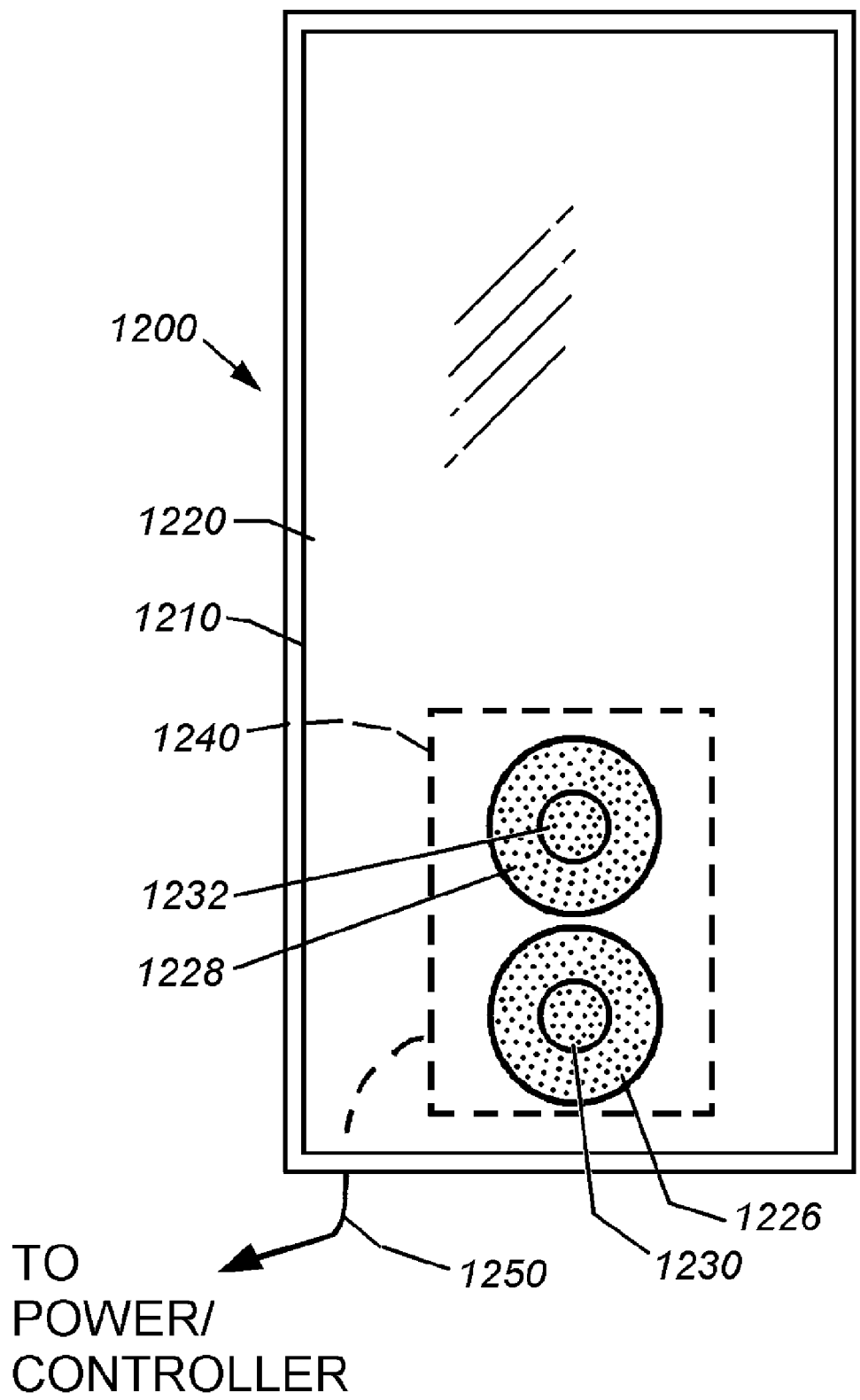
FIG. 12 is a frontal view of a vehicle mirror face, used for example, on a tractor trailer showing an integrated stereo camera head according to an illustrative embodiment of the invention.

According to an alternate embodiment as shown in, one or both of the stereo vision cameras for each side of the object detection system can be integrated directly into a mirror. In part due the relatively small size of available camera sensors, most large mirrors can accommodate one or more cameras within their housing. FIG. 12 details a basic mirror assembly 1200, which includes a housing frame 1210 and a mirror glass 1220. The mirror glass is modified with transparent (potentially unsilvered) ports 1226, 1228 to allow for see-through viewing of two respective camera lenses 1230, 1232, which are part of two cameras within a stereo head 1240 (shown in phantom). The data and power for the head 1240 is routed along a cable 1250 that can be part of an overall wiring harness for the mirror (e.g. for providing power adjustment, defrost heat and the like). Since the mirror is separately adjustable to suit the driver's needs, the head can be gimbaled, or otherwise movably mounted within the housing to maintain a predetermined orientation relative to the vehicle side, despite the adjustment position of the mirror. The head 1240 can include a powered adjustment unit that maintains a desired angle as the mirror is adjusted. The ports are large enough to allow a range of angular adjustment for the head versus the mirror glass without occluding the view of the camera lenses 1230, 1232. In alternate embodiments, the head can be mounted as part of a mirror assembly, but outside the mirror glass.

Figure 13:
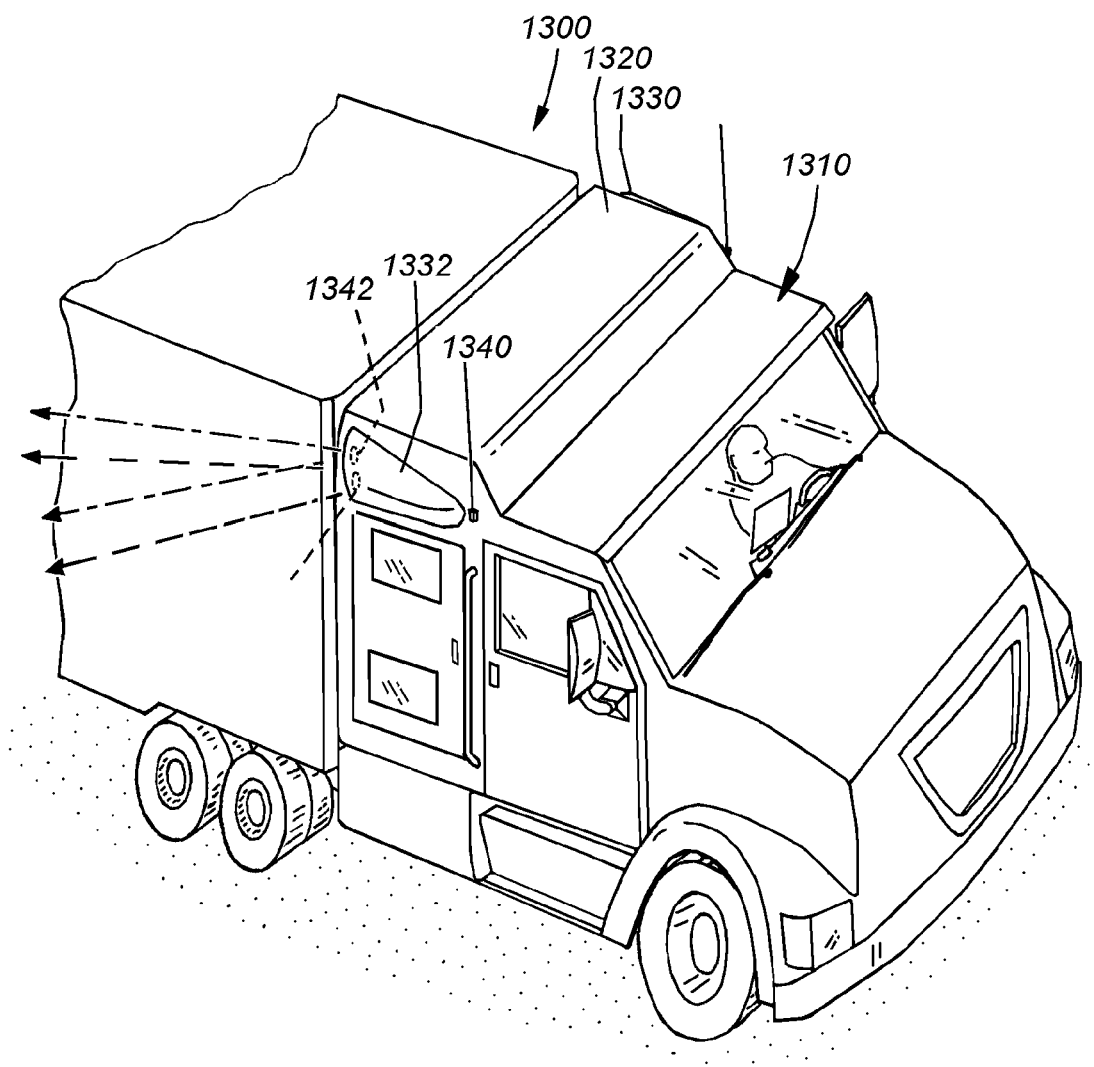
FIG. 13 is a partial perspective view of an exemplary tractor trailer including an aerodynamic-fairing-mounted stereo camera assembly according to an alternate embodiment of the present invention.

In another alternate embodiment, shown in FIG. 13, the cab 1310 of an exemplary tractor trailer has been modified so that the upper aerodynamic fairing (found as an original or add-on feature in most modern trucks) 1320 includes cowlings 1330, 1332 that define a generally aerodynamic shape and that house one or more rear-facing stereo vision cameras in accordance with an embodiment of this invention. In this example the cowlings 1330, 1332 each include two cameras (for example cameras 1340, 1342 in cowling 1332). In alternate embodiments, each cowling maintains only one camera and another is provided on a mirror, fender or other convenient, sufficiently outboard location. Aerodynamic fairings can be manufactured to accept cameras and camera heads in accordance with this invention.

Although the illustrative embodiment described herein is setup in the factory using factory setup procedures, persons having ordinary skill in the art should appreciate that any of the described setup steps can also be performed in the field without departing from the scope of the invention. Also, although an interior orientation process for determining the internal geometry of cameras in terms of the camera constant, the image center radial distortion coefficients and aspect ratio, those of ordinary skill in the art should appreciate that additional intrinsic parameters may be added or some of these parameters ignored in alternative embodiments within the scope of the present invention.

In addition, while ground plane calibration in the illustrative embodiments described herein is performed for each particular vehicle mounting class, persons having ordinary skill in the art should appreciate that ground plane calibration could also be performed in the factory or at alternate locations without departing from the spirit and scope of the invention. Additionally, although edge enhancement is performed in the illustrative embodiments described herein by performing a Max–Min filter operation, persons having skill in the art should appreciate that any number of edge-processing techniques known in the art can be used to accomplish this step without departing from the spirit and scope of the present invention.

Moreover, although the dense matching step of an illustrative embodiment is described herein, wherein pixels are matched in an edge-enhanced image using a SAD (Sum of Absolute Differences) strength of match, followed by implementing a uniqueness constraint, persons having ordinary skill in the art should appreciate that various alternative matching processes can be substituted without departing from the spirit and scope of the present invention. Those skilled in the art will appreciate that the method and apparatuses described herein can also be used to detect obstacles around other moving objects, such as boats trains, for example.

Those skilled in the art will further appreciate that some, or all, of the steps of edge detection, correspondence matching rectification, and filtering described hereinbefore can be combined and effected as hardware implementations, software implementations or a combination thereof. Moreover, although the exemplary embodiment often refers to elongated vehicles, it should be clear to those skilled in the art that obstacles, such as fast-approaching vehicles, or falling back vehicles, or lightweight vehicles, such as cars, can also be detected using the teachings herein. Also, while the arrangement of stereo camera baseline described herein is aligned as substantially vertical or substantially horizontal, it should be clear that, with some drawbacks known in the art, the baseline can be arranged at any angle therebetween.

Additionally, although the monitoring of each side and back of the vehicle is described for two cameras, those skilled in the art will realize that more than two cameras in an arrangement can also be used in accordance with the teachings herein. To this end, the term "stereo pair" can be used tom described two or more, cameras that can be coordinated into a single object detection system using the techniques described herein. Where more than two cameras are employed on a given side, the techniques for discriminating objects and associated range thereof can be modified to allow incorporation of data from the third (or greater) camera(s). Furthermore, while the invention has been shown and described with respect to exemplary embodiments thereof, various other changes, omissions, and additions in the form of, and detail thereof, may be made therein without departing from the spirit and scope of the invention.

Note that, by way of further background, the teachings of commonly assigned U.S. patent application Ser. No. 10/388, 925, entitled number entitled STEREO DOOR SENSOR, and commonly assigned U.S. patent application Ser. No. 10/702, 059 entitled METHOD AND SYSTEM FOR ENHANCED PORTAL SECURITY THROUGH STEREOSCOPY are expressly incorporated herein by reference.

In summary, the above-described system and method for object detection and collision avoidance described herein provides a novel and effective way to identify moving objects and vehicles located behind the cab of an elongated, and possibly tandem, vehicle. Through the use of narrow-baseline stereo vision, the system and method can employ relatively inexpensive cameras, in a stereo relationship, on a low-profile mounting, to perform reliable detection with good range discrimination. The field of detection is sufficiently behind and aside the rear area to assure an adequate safety zone in most instances. Moreover, this system and method allows all equipment to be maintained on the cab of a tandem vehicle, rather than the interchangeable and more-prone-to damage cargo section and/or trailer.

The foregoing has been a detailed description of illustrative embodiments of the invention. Various modifications and additions can be made without departing from the spirit and scope if this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, in alternate embodiments it is contemplated that one or more camera sensors (stereo or single lens) may be mounted on the trailer/cargo carrier of the vehicle. This mounting can be permanent or can be accomplished using detachable mountings that allow cameras to be detached from trailers or the cab when not in use. Likewise, the data connection between the camera sensors and main controller can be wireless in alternate embodiments, allowing cameras to operate using onboard battery power or a simple power connection from the trailer and/or cab. In addition, it is expressly contemplated that the processes described herein can be implemented using electronic or computer hardware, software consisting of a computer-readable medium of program instructions, or a combination of hardware and software. Accordingly, this description is meant to be taken only by way of example, and not to otherwise limit the scope of this invention.

What is claimed is:

1. A system for detecting objects and vehicles comprising:
a pair of cameras mounted on a host vehicle, and arranged with respect to each other in a narrow-baseline orientation and directed rearwardly from a front section of the host vehicle so as to view an area along a side of the host vehicle and beyond a back end of the host vehicle, wherein the pair of cameras include a field of view having an area of increased resolution of pixels along the narrow-baseline orientation;
a processor that detects an object or vehicle and that derives an approximate range based upon an input image from each of the pair of cameras; and
an output device that reports detection of the object or vehicle within a predetermined range of the host vehicle.

2. The system as set forth in claim 1 wherein each of the pair of cameras are mounted so as to orient the narrow-baseline in a substantially vertical direction normal to a ground surface beneath the host vehicle.

3. The system as set forth in claim 2 wherein the increased resolution of pixels is oriented along the vertical direction.

4. The system as set forth in claim 1 wherein at least one of the pair of cameras is mounted on a rear view mirror on a side of the host vehicle.

5. The system as set forth in claim 4 wherein each of the pair of cameras is mounted in a stereo head housing on the rear view mirror.

6. The system as set forth in claim 4 wherein the at least one of the pair of cameras is mounted within a housing of the rear view mirror as an integrated mirror unit.

7. The system as set forth in claim 4 wherein another of the pair of cameras is mounted at a location on the host vehicle remote from the rear view mirror.

8. The system as set forth in claim 1 wherein at least one of the pair of cameras is mounted on an aerodynamic fairing of the host vehicle.

9. The system as set forth in claim 8 wherein the aerodynamic fairing includes a cowling that houses the at least one of the pair of cameras so as to allow the at least one of the pair of cameras to view the area along a side of the host vehicle and beyond a back end of the host vehicle.

10. The system as set forth in claim 1 wherein the processor performs an image rectification process, an image smoothing process and a max-min filter process constructed and arranged to condition image data from each of the pair of cameras and a matching process that matches the conditioned image data to derive a disparity image from which objects and vehicles above a ground surface beneath the host vehicle are detected in accordance with parameters of a disparity criteria image.

11. The system as set forth in claim 10 further comprising a spurious edge filtering process and an edge aggregation process that act upon detected images of objects and vehicles so as to generate a report of detected objects that is provided to the output device.

12. The system as set forth in claim 11 wherein the host vehicle comprises a tractor trailer and the front section comprises a cab thereof.

13. A method for detecting objects and vehicles with respect to a host vehicle comprising the steps of:
mounting each of a pair of cameras on the host vehicle so as to be arranged with respect to each other in a narrow-baseline orientation and directed rearwardly from a front section of the host vehicle so as to view an area along a side of the host vehicle and beyond a back end of the host vehicle, wherein the pair of cameras include a field of view having an area of increased resolution of pixels along the narrow-baseline orientation;
detecting an object or vehicle and deriving an approximate range based upon an input image from each of the pair of cameras; and
reporting detection of the object or vehicle within a predetermined range of the host vehicle.

14. The method as set forth in claim 13 wherein the step of mounting includes orienting the narrow-baseline in a substantially vertical direction normal to a ground surface beneath the host vehicle.

15. The method as set forth in claim 14 wherein the increased resolution of pixels is oriented along the vertical direction.

16. The method as set forth in claim 13 wherein the step of mounting includes attaching at least one of the pair of cameras on a rear view mirror on a side of the host vehicle.

17. A system for detecting objects and vehicles comprising:
a pair of cameras mounted on a host vehicle, and arranged with respect to each other in a narrow-baseline orientation and directed so as to view an predetermined area with respect to the host vehicle, wherein the pair of cameras include a field of view with an area of increased resolution of pixels oriented along the vertical direction;
a processor that detects an object or vehicle and that derives an approximate range based upon an input image from each of the pair of cameras; and
an output device that reports detection of the object or vehicle within a predetermined range of the host vehicle.

18. The system as set forth in claim 17 wherein each of the pair of cameras are mounted so as to orient the narrow-baseline is a substantially vertical direction normal to a ground surface beneath the host vehicle.

19. The system as set forth in claim 18 wherein the processor performs an image conditioning process that acts upon image data from each of the pair of cameras prior to detection of the objects or vehicles.

20. The system as set forth in claim 19 wherein the image conditioning process includes an image rectification process, an image smoothing process and a max-min filter process, each being constructed and arranged to condition image data from each of the pair of cameras, and further comprising a matching process that matches the conditioned image data to derive a disparity image from which objects and vehicles above a ground surface beneath the host vehicle are detected in accordance with parameters of a disparity criteria image.

* * * * *